United States Patent
Karpov et al.

(10) Patent No.: US 12,552,998 B2
(45) Date of Patent: Feb. 17, 2026

(54) SUPPRESSION OF COKE FORMATION IN HYDROCARBON PROCESSING EQUIPMENT

(71) Applicant: COOLBROOK OY, Helsinki (FI)

(72) Inventors: Alexander Karpov, Helsinki (FI); Denis Semenov, Helsinki (FI); Vahid Sudzhadinov, Helsinki (FI)

(73) Assignee: COOLBROOK OY, Helsinki (FI)

( * ) Notice: Subject to any disclaimer, the term of this patent is extended or adjusted under 35 U.S.C. 154(b) by 437 days.

(21) Appl. No.: 18/333,846

(22) Filed: Jun. 13, 2023

(65) Prior Publication Data

US 2023/0407192 A1    Dec. 21, 2023

(30) Foreign Application Priority Data

Jun. 16, 2022 (FI) .................................. 20225536

(51) Int. Cl.
*C10G 47/32* (2006.01)
*C10G 47/36* (2006.01)

(52) U.S. Cl.
CPC .............. *C10G 47/32* (2013.01); *C10G 47/36* (2013.01); *C10G 2300/4006* (2013.01); *C10G 2300/708* (2013.01); *C10G 2300/807* (2013.01); *C10G 2400/20* (2013.01)

(58) Field of Classification Search
CPC ..................... C10G 47/32; C10G 47/36; C10G 2300/4006; C10G 2300/708; C10G 2300/807; C10G 2400/20; C10G 9/24; C10G 9/16; C10G 9/18; B01F 25/641;

(Continued)

(56) References Cited

U.S. PATENT DOCUMENTS

| 7,232,937 B2 | 6/2007 | Bushuev |
| 9,234,140 B2 | 1/2016 | Seppala et al. |
| 9,494,038 B2 | 11/2016 | Bushuev |

(Continued)

FOREIGN PATENT DOCUMENTS

| EP | 1063273 A1 | 12/2000 |
| EP | 1527151 B1 | 7/2018 |

(Continued)

OTHER PUBLICATIONS

International Search Report for PCT/FI2023/050353 dated Sep. 25, 2023.

(Continued)

*Primary Examiner* — Prem C Singh
*Assistant Examiner* — Juan C Valencia
(74) *Attorney, Agent, or Firm* — NIXON & VANDERHYE

(57) ABSTRACT

A method for reducing coke formation during thermal or thermochemical conversion of hydrocarbon feedstocks in a gaseous diluent using a rotary reactor provided. The method includes supplying an amount of additional gaseous diluent into high-temperature region or regions of the reactor, where conditions are established for thermal or thermochemical conversion to occur. In these regions, the additional gaseous diluent is supplied into a reaction space through perforations and/or pores made in stationary blades or in other surfaces enclosing a process fluid flow. A rotary apparatus configured to implement the method is further provided.

20 Claims, 7 Drawing Sheets

(58) Field of Classification Search
CPC .... B01F 31/00; B01J 19/1806; B01J 19/1831; F04D 29/44
See application file for complete search history.

(56) References Cited

U.S. PATENT DOCUMENTS

| | | |
|---|---|---|
| 10,744,480 B2 | 8/2020 | Xu et al. |
| 2008/0149532 A1 | 6/2008 | Stell et al. |
| 2014/0243569 A1* | 8/2014 | Seppala .................... B01J 3/08 585/653 |

FOREIGN PATENT DOCUMENTS

| | | |
|---|---|---|
| WO | 2006081696 A1 | 8/2006 |
| WO | 2022106754 A1 | 5/2022 |

OTHER PUBLICATIONS

Office Action issued in Finnish Patent Application No. 20225536 dated Dec. 16, 2022.
Search Report issued in Finnish Patent Application No. 20225536 dated Dec. 16, 2022.

\* cited by examiner

SUPPRESSION OF COKE FORMATION IN HYDROCARBON PROCESSING EQUIPMENT

CROSS-REFERENCE TO RELATED APPLICATIONS

This application claims the priority under 35 USC 119(a) of FI patent application 20225536 filed on Jun. 16, 2022, the entirety of which is incorporated herein by reference.

FIELD OF THE INVENTION

Present invention generally relates to suppressing carbonaceous deposits in processes for thermal or thermochemical conversion of hydrocarbon feedstocks. In particular, the invention concerns a method for reducing formation of coke and other foulants on surfaces of a bladed rotary reactor designed for steam cracking.

BACKGROUND

Light olefins, such as ethylene and propylene, are broadly used in petrochemical and chemical industries for production of a variety of components including polymers, plastic, synthetic fibers, and rubbers. Ethylene is a fundamental compound used as a source material in manufacturing of important industrial chemicals including polyethylene, ethylene oxide, vinyl chloride, vinyl acetate etc., and it is a crucial component in petrochemical supply chains employed in manufacturing of commodities, such as for example plastic goods, fibers, paints, coatings, cleaners, solvents and packaging materials.

Conversion of common feeds, such as gasoil, naphtha, liquefied petroleum gas (LPG) and ethane to ethylene is traditionally performed using thermal- or catalytic conversion processes. The process of thermal degradation using steam as dilution medium is known as steam cracking or pyrolysis. In conventional tube type cracking furnaces hydrocarbon feed and steam are first mixed and preheated in a convection section and then enter a radiant section (radiant coils) of the furnace, where cracking reactions take place at about 700-900° C. with residence times ranging from a few seconds to a fraction of a second.

Rotary reactor technology has been successfully employed in steam cracking as an alternative to tube furnaces. Various rotary reactor configurations are described for example in U.S. Pat. No. 9,494,038 (Bushuev), U.S. Pat. No. 9,234,140 (Seppala et al), and U.S. Pat. No. 10,744,480 (Xu & Rosic). Amongst those, U.S. Pat. Nos. 9,494,038 and 9,234,140 concern rotary reactors comprising a rotor disk with associated blade cascade disposed between the rows of stationary blades (stator cascades) arranged on essentially ring-shaped supports and enclosed within a toroid-shaped gas casing. U.S. Pat. No. 9,234,140 also outlines an axial-type reactor, where rotating and stationary blades are arranged in an essentially tubular casing, while U.S. Pat. No. 10,744,480 describes a radial-flow type reactor configuration.

In all mentioned rotary devices, the hydrocarbon feed diluted with steam enters a reaction space formed with an interior of the reactor and sequentially passes through the rows of stationary- and rotor blades several times prior to exiting the reactor. Upon propagation through the rows of stationary and rotating blades in the reactor space, process fluid is heated to a temperature at which the feed hydrocarbons decompose to yield lower molecular weight hydrocarbons.

Inevitable constraint of thermal/pyrolytic cracking is formation and accumulation of carbonaceous deposits, predominantly coke. Formation of coke negatively affects the rates of process gas conversion and reduces the yields of target olefins. In rotary reactor designs cited above, heat is transferred directly to gas flow, and a coke layer formed on reactor surfaces causes distortions in the shape of a flow path including blades. As a result, the gas-dynamic efficiency of the reactor declines, the reactor shaft power drops and the temperature at the reactor exit decreases. Non-optimal temperature profile causes reduction in the yield of target pyrolysis products, respectively. On the other hand, in conventional tube type cracking furnaces, the coke layer formed on reactor surfaces impedes heat transfer through the reactor wall, which could lead to increased greenhouse gas emissions.

However, frequent decoking with conventional methods, such as for example burning a mixture of high-pressure air and steam (at temperatures up to about 900° C.) shortens a lifetime of the cracking equipment. Additionally, decoking requires a production line to be halted for about 20-40 hours, which has a considerable adverse effect on the economics of the process.

In rotary reactor designs described above, coke formation is the most intense in a reactor zone, where reaction temperature exceeds approximately 750-850° C. This is also the zone, where cracking reactions are the most intense.

Steam as a dilution medium reduces the rate of cracking reactions by decreasing the partial pressure of hydrocarbons, which enhances selectivity of target olefins (e.g. ethylene) and reduces coke deposits on reactor surfaces. In known solutions, steam is added to the hydrocarbon feed before it enters the reaction zone. Maximum product capacity is then determined by calculating optimal reaction temperatures, feed temperature (preheating) and steam-to-hydrocarbon ratio.

However, development of improved methods against coke formation in thermal cracking equipment still remains an up-to-date challenge, in particular, in view of optimizing and improving energy- and cost efficiency of ethylene production in industrial scale.

SUMMARY OF THE INVENTION

An objective of the present invention is to solve or to at least alleviate the problems arising from the limitations and disadvantages of the related art. The objective is achieved by various embodiments of a method for reducing coke formation during thermal or thermochemical conversion of hydrocarbon feedstocks and related equipment.

In an aspect, a method for reducing coke formation during thermal or thermochemical conversion of hydrocarbon feedstocks in presence of steam using a rotary reactor is provided, according to what is defined in the independent claim 1.

In embodiment, a method for reducing coke formation during thermal or thermochemical conversion of hydrocarbon feedstocks in presence of steam is provided, using a rotary reactor comprising a rotor with a plurality of rotor blades arranged into at least one row over a circumference of a rotor hub mounted onto a rotor shaft, and a plurality of stationary vanes arranged adjacent to the at least one row of rotor blades, wherein the rotor and the plurality of stationary vanes are enclosed in a duct formed in a casing between at least one inlet and at least one outlet, the method comprises:

during propagation of a process fluid provided as mixture of hydrocarbon feed and dilution steam in the duct between at least one inlet and at least one outlet, supplying an amount of additional steam into a duct region or regions where conditions are established for thermal or thermochemical conversion to occur in the process fluid, wherein said additional steam is supplied into the duct through perforated and/or porous surfaces arranged on selected portions of the duct and/or on stationary vanes.

Additionally or alternatively, supply of additional steam may be realized through at least some of the rotor blades.

In embodiment, the method comprises supplying the amount of additional steam into the process fluid propagating through the duct region(s), where reaction temperature equals to or exceeds a value of about 750 degrees Centigrade (° C.).

In embodiment, the method comprises supplying the amount of additional steam into the duct region(s) accommodating a number of last working stages of the rotary reactor.

In embodiment, the method comprises supplying the amount of additional steam into the duct through perforated and/or porous surfaces arranged on stationary guide vanes upstream of the rotor blades, and optionally on stationary diffuser vanes downstream of the rotor blades.

In embodiment, the method comprises supplying the amount of additional steam into the duct through perforated and/or porous surfaces arranged on selected portions of the duct facing the process fluid flow.

In embodiment, the method comprises supplying the amount of additional steam into the duct through perforated and/or porous surfaces arranged along a duct-defining inner wall of the casing.

In embodiment, the method comprises supplying the amount of additional steam into the duct through perforated and/or porous surfaces arranged along a duct-defining wall of a flow-shaping device.

In embodiment, the method comprises directing the amount of additional steam towards perforated and/or porous surfaces via a number of distribution channels connected to an external steam source or sources.

In embodiment, the perforated and/or porous surfaces are composed of composites, metals, metal alloys, ceramics, cermets, or combinations thereof.

In embodiment, the method further comprises reducing an amount of steam at the reactor inlet or inlets.

In embodiment, the amount of additional steam is up to about 30% out of a total amount of steam used in thermal or thermochemical conversion process.

In embodiment, said additional steam supplied into the duct is adjusted to a temperature lower than the temperature of the process fluid stream to cool parts and components of the rotary reactor.

In embodiment, thermal or thermochemical conversion of hydrocarbon feedstocks is steam cracking of hydrocarbon feedstocks to produce olefins, such as ethylene and propylene.

In another aspect, a steam delivery arrangement is provided for a rotary reactor used in thermal or thermochemical conversion of hydrocarbon feedstocks in presence of steam, according to what is defined in the independent claim 14.

In another aspect, a rotary reactor for thermal or thermochemical conversion of hydrocarbon-containing feedstocks in a gaseous diluent is provided, according to what is defined in the independent claim 15.

In embodiment, the rotary reactor comprises the steam delivery arrangement according to some previous aspect.

The utility of the present invention arises from a variety of reasons depending on each particular embodiment thereof. At first, the proposed method allows for efficient suppression of formation and accumulation of carbonaceous deposits, such as coke and other foulants, on reactor surfaces facing the process fluid flow in a highly targeted manner. Those regions of the reactor can be targeted, where coke formation is the most intense. The method further enables fine-tuning of steam-to-hydrocarbon ratio during the conversion process, which provides further flexibility in regulating conversion rates and olefin yield.

The method is energy-efficient. It allows reducing an amount of dilution medium, such as steam, fed into the cracking process at the reactor inlet. Dilution steam reduction at the reactor inlet is proportional to an amount of additional steam fed into the regions particularly susceptible to coke formation. In practice, this amount can constitute up to 30-35 percent. Hence, the process does not require inputting additional energy for heating steam diluent. Provision of additional steam separation equipment downstream of the cracking reactor can be omitted, accordingly.

Through efficiently suppressing fouling of the reactor surfaces, the method enables preserving gas-dynamic properties of the reactor at a level required for maintaining optimal temperature profiles throughout the reaction space during significantly longer time periods, which, in turn, extends time spans between decoking procedures. The invention thus eliminates the need in frequent (every few weeks) decoking of the cracking reactor, whereby the system's shut down periods associated with decoking can be minimized Costs related to maintenance and repair can be reduced, and the lifetime of the reactor can be considerably extended. In an absence of coke layer on the reaction surfaces, also the yield of desired products can be preserved steadily high.

The expression "a number of" refers hereby to any positive integer starting from one (1), e.g. to one, two, or three. The expression "a plurality of" refers hereby to any positive integer starting from two (2), e.g. to two, three, or four. The terms "first" and "second", are used hereby to merely distinguish an element from another element without indicating any particular order or importance, unless explicitly stated otherwise.

In present disclosure, working or rotating blades of a turbomachine type reactor are primarily referred to with the term "blades"; whereas stationary blades are primarily referred to with the term "vanes".

The term "gasified" is utilized herein to indicate matter being converted into a gaseous form by any possible means.

BRIEF DESCRIPTION OF THE DRAWINGS

Different embodiments of the present invention will become apparent by consideration of the detailed description and accompanying drawings.

DETAILED DESCRIPTION

Figure 1A:
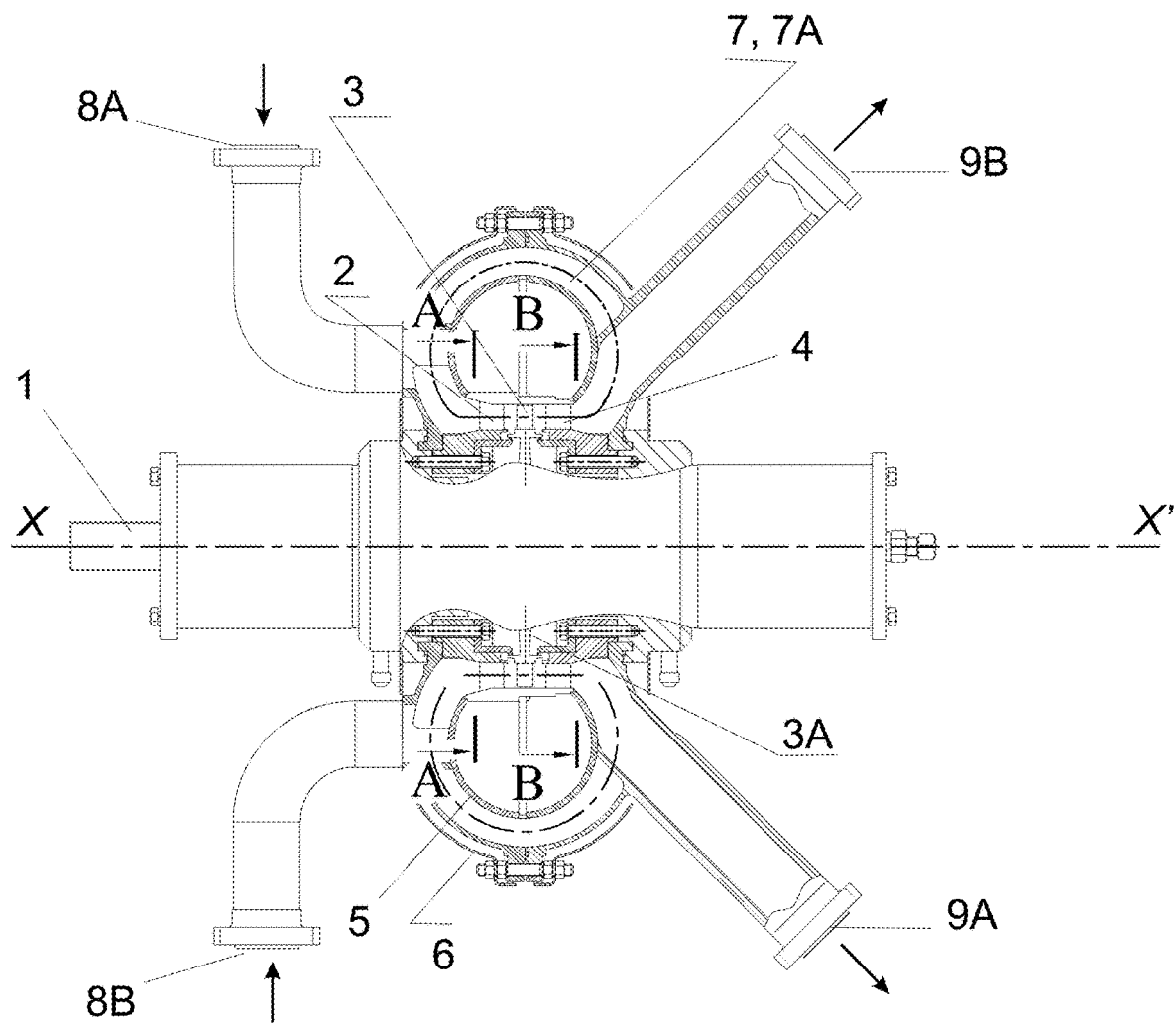
FIG. 1A is a vertical crosscut of a reactor apparatus 100, 100A configured for implementing the method according to the embodiments.

Detailed embodiments of the present invention are disclosed herein with the reference to accompanying drawings. The same reference characters are used throughout the drawings to refer to the same members, where:

100, 100A, 100B, 100C, 100D—a reactor apparatus;
1—a rotor shaft;
2, 4—stationary vane cascades and related stationary vanes;
3—rotor blade cascade and related rotor blades;
3A—a rotor hub/a rotor disk;
5—a flow-shaping device;
6—a gas casing;
7, 7A—a duct and its vaneless portion(s), respectively;
8, 8A, 8B—an inlet;
9, 9A, 9B—an outlet;
10—high temperature area(s);
11—perforated and/or porous surfaces for delivery of additional dilution medium into the duct;
12, 12A, 12B—supply and distribution channels for directing additional dilution medium towards the porous and/or perforated surface, wherein 12B designates a distribution space provided as an expansion of branched channel(s) 12A;
13—a drive engine;
14—external housing of the reactor.

Present invention pertains to a method for preventing or at least markedly reducing formation of carbonaceous deposits and accumulation of the same on surfaces of feedstock processing equipment used in thermal and/or chemical conversion of hydrocarbon feedstocks, where feed enters a reaction space as a mixture of hydrocarbons and dilution medium. In particular, the method allows for efficiently suppressing fouling and coke formation inside a rotary reactor configured for thermal/thermochemical processing of hydrocarbon feedstocks. Conversion may include reactions of thermal or thermochemical degradation occurring while a mixture of hydrocarbon feed and dilution medium propagates through the reaction space.

The method comprises supplying an amount of additional dilution medium (diluent) into such region or regions of the reaction space, where conditions are established for thermal or thermochemical conversion to occur. These are the regions where the highest severity of the operating conditions is achieved and where reaction temperature is the highest, respectively. Because hydrocarbon feedstock conversion reactions are the most intense in said high-severity/high-temperature region(s), mentioned region(s) are particularly prone to fouling through formation and accumulation of carbonaceous deposits such as coke. In some instances, the high-temperature regions are also regions, where the extent of feed conversion is the highest.

High temperature regions are designated on FIGS. 1B and 2A-2C with a reference numeral 10. In regions 10 conditions are established for thermal or thermochemical conversion to occur. In embodiments, such conditions are established when the temperature of a stream of the process fluid propagating through the reactor reaches a value within a range of at least about 700-750 degrees Centigrade (° C.). Dependent on feedstock, reaction temperatures are within a region of about 700° C. to about 950° C.

The term "additional" denotes, in present context, an amount of dilution media supplied into the reaction space in addition to "main" diluent mixed with the hydrocarbon feed at a reactor entrance. In described embodiments, the additional diluent and the main diluent are preferably the same (having the same composition of matter).

Alternative configurations where the additional diluent differs from the main diluent in terms of composition of matter may be conceived where appropriate.

In embodiments, the disclosed method is adopted for use in processes of thermal or thermochemical cracking of hydrocarbon feedstocks in presence of a gaseous diluent. In embodiments, the gaseous diluent is (water) steam. In embodiments, steam is used as a dilution medium for hydrocarbon feed at the reactor entrance and as an additional diluent delivered, in a targeted manner, into high-temperature areas of the reaction space. The disclosed method can be advantageously adopted for steam cracking of hydrocarbon feedstocks to produce lower molecular weight products.

In embodiments, hydrocarbon feedstocks include, but are not limited to naphthas and gasoils, liquefied petroleum gas/LPG (LPG: propane and butanes), and natural gas liquids gas liquids/NGL (ethane, propane, butane). Propanes and heavier fractions can be further utilized. Other feedstocks may be utilized where appropriate.

The disclosed method can be put into practice in a rotary turbomachine-type reactor 100 configured for thermal or thermochemical conversion of hydrocarbon feedstocks and comprising a casing with at least one inlet and at least one outlet, a rotor with a plurality of rotor blades arranged into at least one row about a circumference of a rotor hub mounted onto a rotor shaft, and a plurality of stationary vanes arranged adjacent to said at least one row of rotor blades, wherein the rotor and the plurality of stationary vanes are enclosed in a duct formed in the casing between at least one inlet and at least one outlet.

Figure 2A:
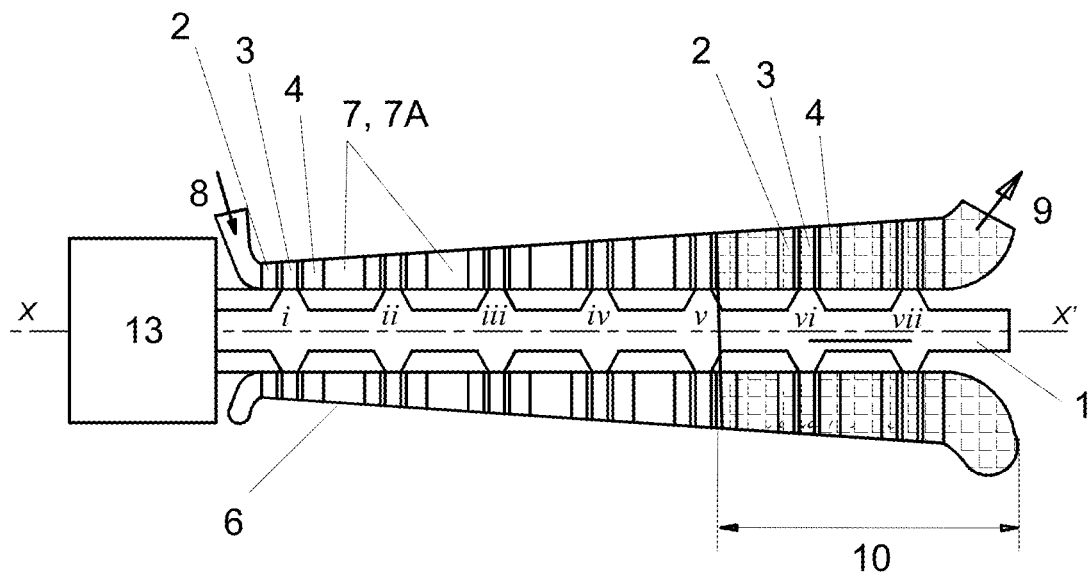
FIGS. 2A, 2B and 2C are vertical crosscuts of the reactor apparatus 100 (100B, 100C and 100D respectively) configured to implement the method according to the embodiments.
Figure 2B:
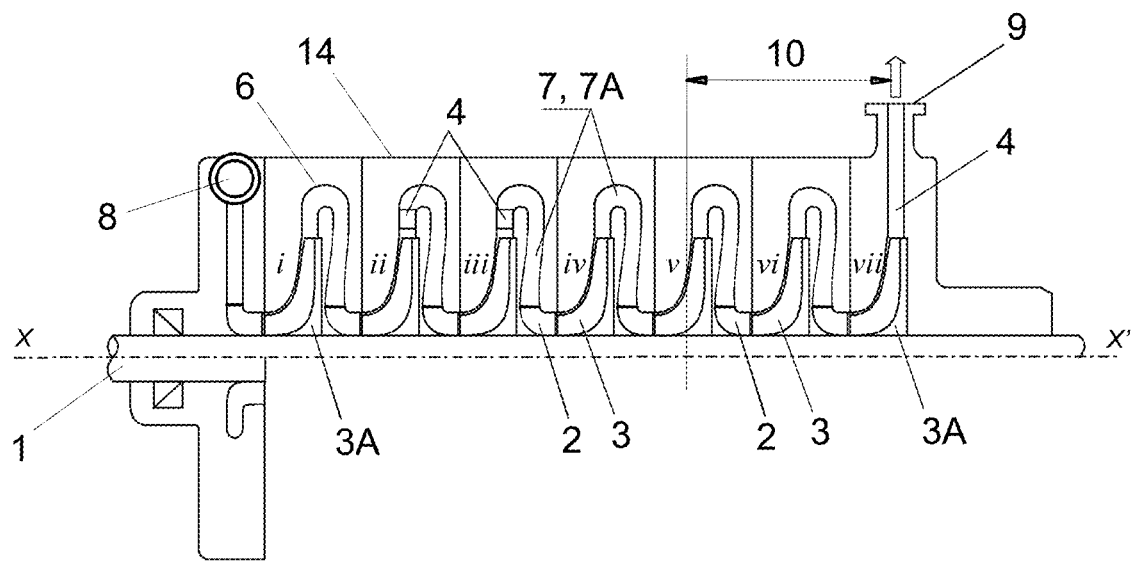

FIGS. 1A, 2A, and 2B illustrate a rotary reactor apparatus 100 embodied at 100A, 100B and 100C, respectively, configured to adopt the disclosed method. It is further assumed that based on a following description, a skilled person would be capable to practise the method in any other type of a rotary reactor, such as for example the reactor 100D depicted on FIG. 2C, as well as those not explicitly disclosed herewith.

Figure 3A:
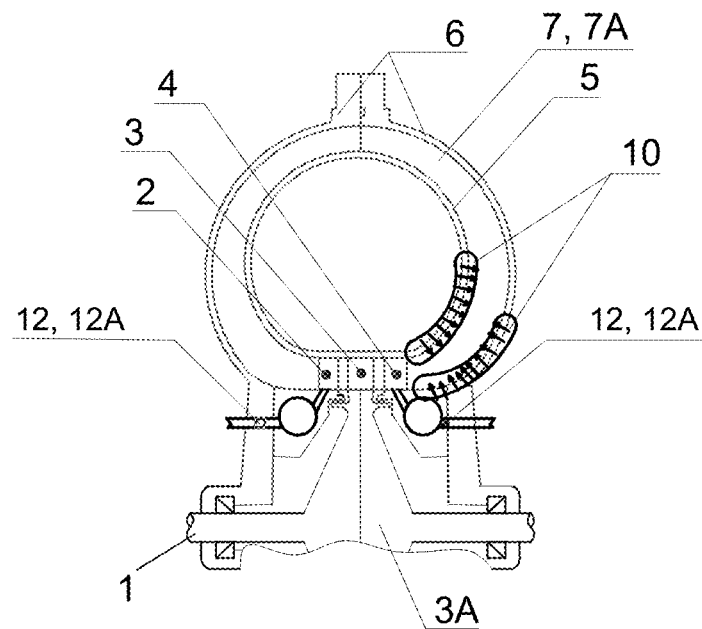
FIGS. 3A, 3B and 3C show a steam supply arrangement installed in the reactor apparatus 100, embodied at 100A, 100B and 100C, respectively.
Figure 3A:
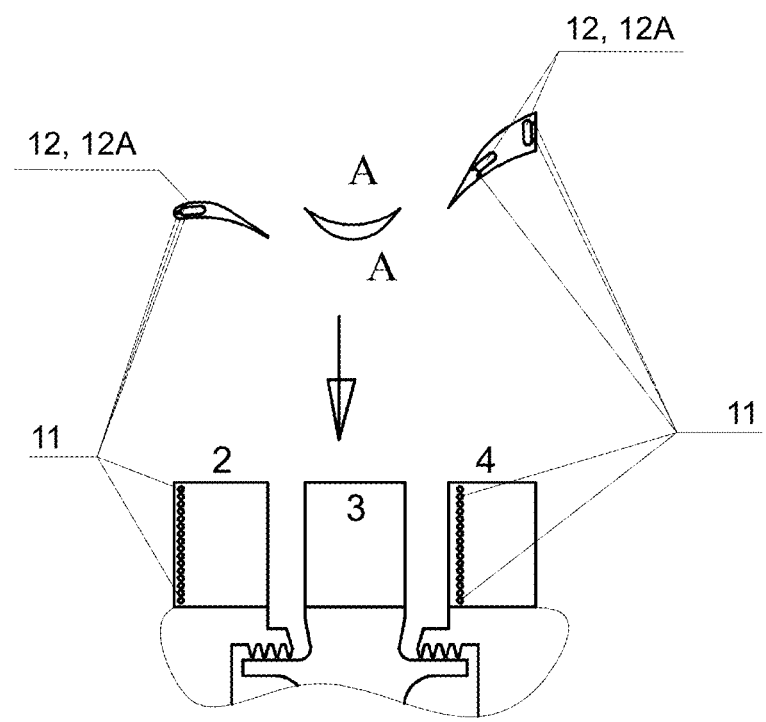
Figure 3B:
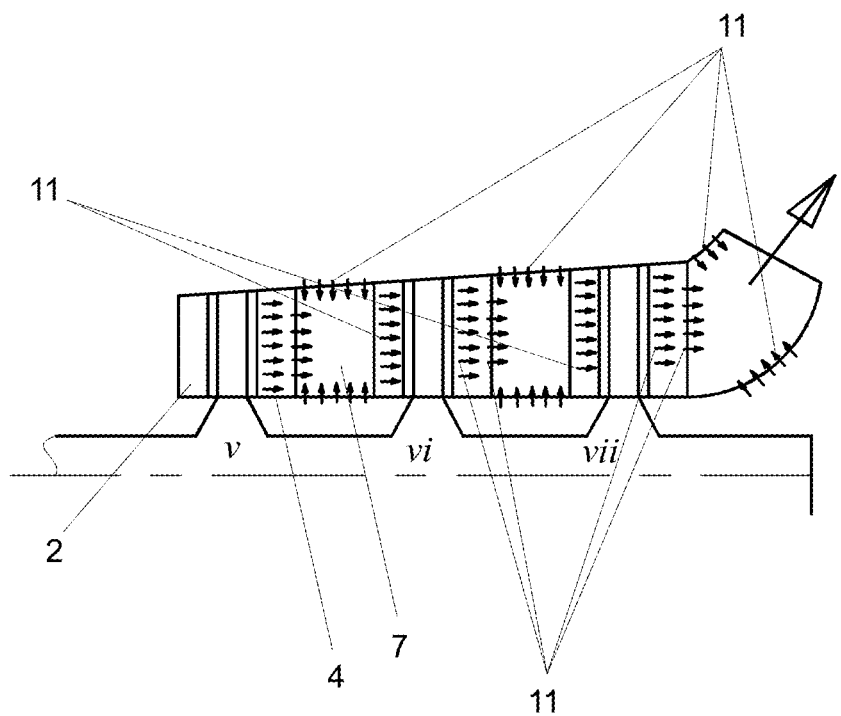
Figure 3B:
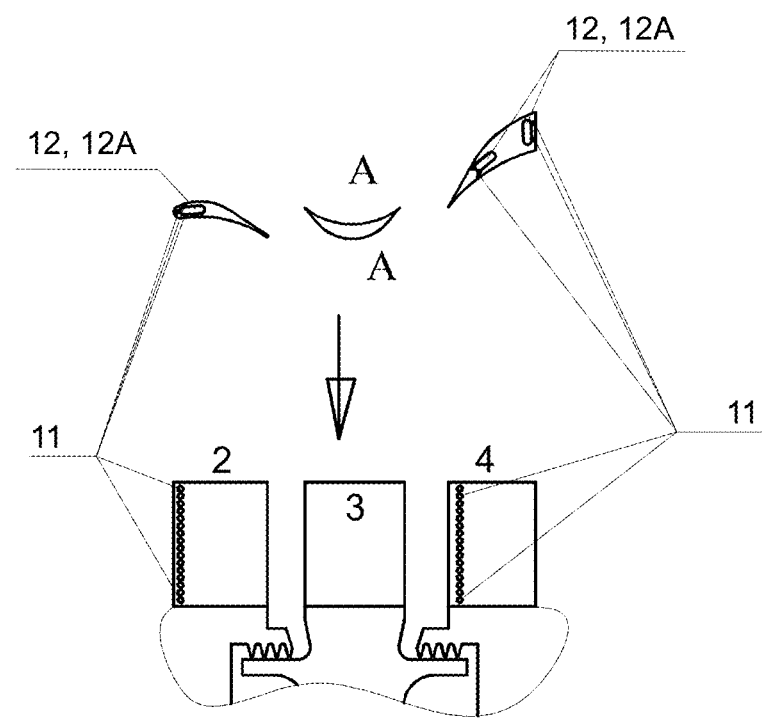
Figure 3C:
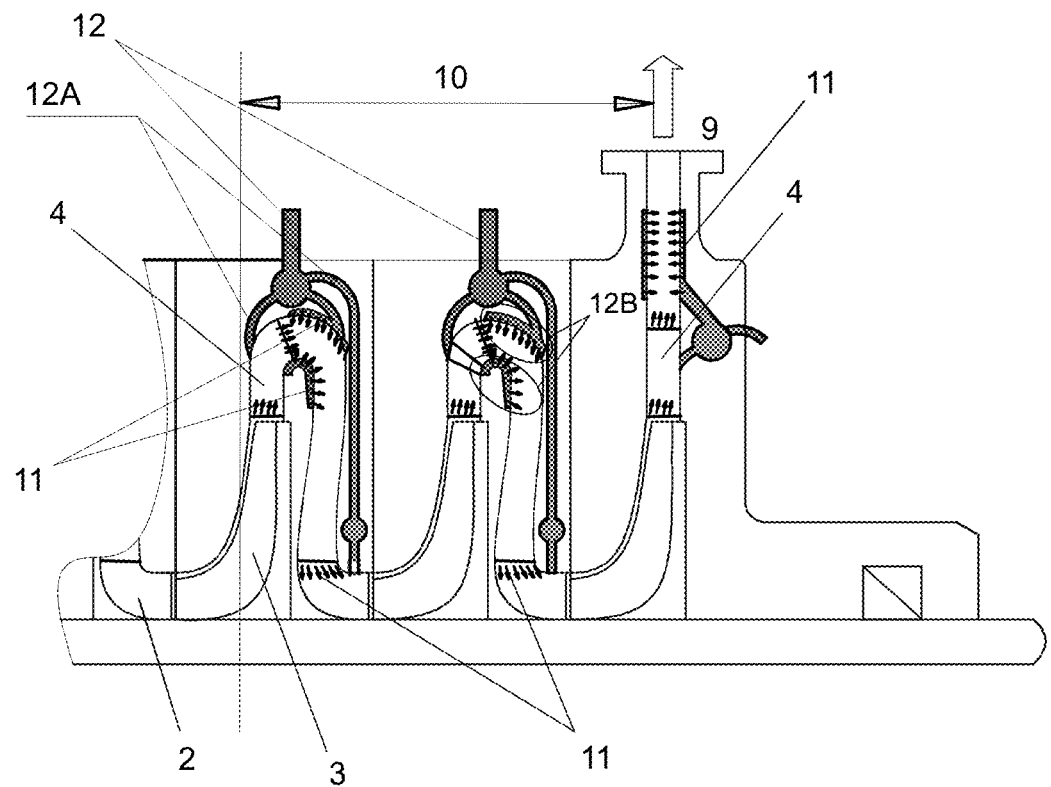

In reactor configurations shown on FIGS. 1A, 3A, the process fluid propagates between the inlet and the outlet along a flow path established in accordance with essentially helical trajectory formed within an essentially toroid-shaped casing, wherein fluidic flow successively passes through the rows of stationary guide vanes, rotor blades and stationary diffuser vanes. Devices of the kind are discussed in detail in the U.S. Pat. No. 9,494,038 to Bushuev and U.S. Pat. No. 9,234,140 to Seppälä et al. FIGS. 2A and 3B illustrate an axial-type reactor, in which rotating and stationary vanes and encompassed in an essentially tubular casing, as described in the disclosure to Seppala et al. FIGS. 2B and 3C illustrate configurations outlined in the U.S. Pat. No. 10,744,480 to Xu & Rosic. The method according to the embodiments can be further realized in a rotary reactor as outlined in the U.S. Pat. No. 7,232,937 to Bushuev (not shown). The entire contents of the above mentioned documents is considered incorporated herein by reference.

The following description pertains to the reactor 100 in all configurations (100A, 100B, 100C and 100D).

The reactor 100 comprises a rotor system, hereafter, a rotor, comprising a rotor shaft 1 positioned along a horizontal (longitudinal) axis X-X' and a plurality of rotor blades (also referred to as working blades) arranged into at least one row over a circumference of a rotor hub or a rotor disk 3A mounted onto the rotor shaft. The plurality of rotor blades arranged into the (blade) row establish a rotor blade assembly or a rotor blade cascade 3.

The rotor is driven by a drive engine, which may be any one of electric motor(s), gas- or steam turbine(s), or any other suitable driver device. Suitable coupling(s) arranged between a motor drive shaft and the rotor shaft, as well as various appliances, such as power converters, controllers and the like, are not described herewith. Drive engine is designated with reference numeral 13 on FIG. 2A.

The reactor 100 further comprises a stationary (stator) component, formed with a number of structures (such as for example a casing 6) defining a reaction space and a plurality of stationary vanes 2, 4.

Stationary vanes are arranged into rows which form stationary vane cascades adjacent to the rotor blade cascades, respectively. A first stationary vane cascade 2 is disposed upstream of the rotor blade cascade 3 and a second stationary vane cascade 4 is disposed downstream of the rotor blade cascade.

The term "cascade" (a crown of blades) refers to an ensemble of (working) blades installed over a periphery of a rotor disk/rotor hub or (stationary) blades installed directly or indirectly on an internal wall of the casing. For clarity, stationary blades are referred to in the present disclosure as "vanes".

The terms "upstream" and "downstream" refer to spatial and/or functional arrangement of structural parts or components with relation to a predetermined part- or component, hereby, the at least one rotor blade row/-cascade, essentially in a direction of fluidic flow throughout the apparatus (along the axis X-X', rf. FIGS. 1A, 2A, 2B).

The cascade arranged upstream of at least one row of rotor blades comprises a plurality of stationary guide vanes. Stationary guide vanes can be configured as stationary nozzle guide vanes (NGV). These vanes form a first stationary vane cascade 2, also referred to as a stationary guide vane cascade. The cascade arranged downstream of at least one row of rotor blades comprises a plurality of stationary diffuser vanes. These vanes form a second stationary vane cascade 4, also referred to as a stationary diffuser cascade. Rotor blade row (cascade) 3 positioned essentially in between the stationary blade rows 2 and 4 together can be viewed as a stator-rotor-stator arrangement 2, 3, 4.

In some configurations, provision of the second stationary vane cascade 4 (a diffuser) may be omitted.

The reactor comprises the gas-tight casing 6 (also referred to as a gas casing or a pressure casing), in where internal passageway 7 is established in the form of a duct or a conduit spread between at least one inlet 8 and at least one outlet 9. Inner surface of the casing 6 faces the duct 7. In some configurations, the duct 7 is defined with the inner surface of the casing. Shape of the conduit/duct 7 varies dependent on reactor configuration.

In present disclosure, the gas casing 6 is generally referred to as a reactor casing. In practice, the reactor 100 can be further enclosed into a separate external housing. Reactor with external housing 14 is illustrated on FIG. 2B.

Figure 2C:
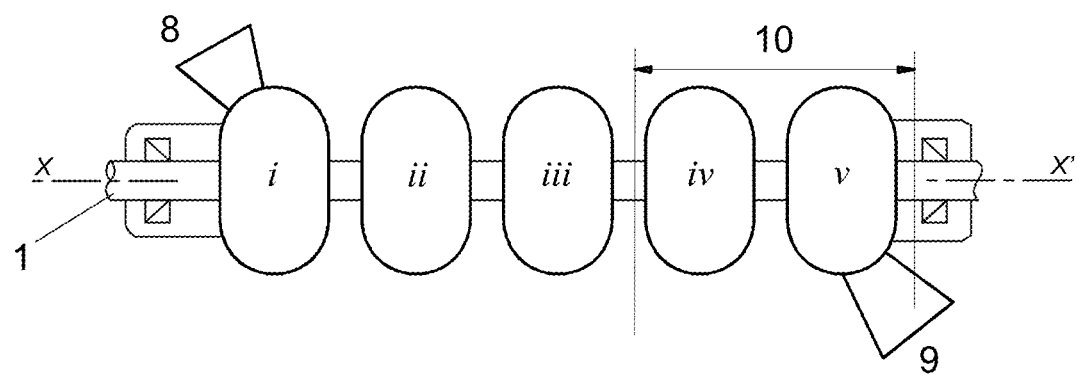

Reactor with two inlets 8A, 8B and two outlets 9A, 9B is shown on FIG. 1A, while FIGS. 2A-2C illustrate configurations with one inlet 8 and one outlet 9. Any other configurations may be conceived where appropriate. The inlet(s) and outlet(s) comprise related openings or ports in the casing 6 and a number of branch pipes, sleeves or manifold channels associated with each said port.

Casing 6 is configured to substantially fully enclose the periphery of the rotor with a plurality of working blades assembled thereon to form at least one rotor blade cascade 3 and a plurality of stationary vanes 2, 4 arranged adjacent to said rotor blade cascade(s).

In the reactor 100, arrangement of blade rows 2, 3, 4 in the internal passageway 7 within the casing 6 is such that a vaneless portion or portions 7A (a so-called vaneless space) is created between an exit from the row of stationary diffuser vanes 4 disposed downstream the rotor blades and an entrance to the row of stationary guide blades 2 disposed upstream the rotor blades.

The reactor 100 is configured with a number of elemental stages also referred to as working- or process stages. In certain configurations, each working stage is formed with successive blade rows of stationary guide vanes 2, rotor blades 3 and optionally stationary diffuser vanes 4. The reactor can be configured as a single stage reactor or a multistage reactor. Multistage configurations including for example 2-10 rows of rotor blades mounted on the rotor shaft can be conceived (rf. for example 100B, 100C, 100D). In such multistage configurations, the stages can be driven by the same or different (e.g. joined) rotor shafts.

Working stages are designated on FIGS. 1B, 2A-2C with roman numerals (i-vii).

The function of elemental stage is to impart mechanical energy to process fluid and to further convert the mechanical energy into thermal energy. During energy conversion cycle, the stationary guide blade row(s) 2 disposed upstream the rotor blades 3 prepare required flow conditions at the entrance of the rotating blade row (cascade). In the rotor blade row, mechanical energy of the shaft and rotating blades is transferred to fluidic stream. In at least the part of each rotor blade row 3 the process fluid flow can reach a supersonic flow condition.

The stationary blade row(s) (diffuser 4) disposed downstream the rotor blades 3 convert(s) mechanical energy of the fluid into its thermal energy (heat). Fluidic flow exits the rotor blades 3 and enters the diffuser 4 at supersonic speed. If the flow upstream of the diffuser is supersonic, the kinetic energy of the fluidic stream is converted into internal energy of the fluid through a system of multiple shocks and viscous mixing and dissipation. The flow dissipates its kinetic energy into internal energy of the fluidic stream propagating through the reactor (along the duct 7) and thus provides the amount of thermal energy to the fluid. An increase in the internal energy of the fluid results in a rise of fluid temperature.

In practice, fluidic flow propagating through the reactor 100 sequentially passes through several working stages, and with each stage/passage the temperature of the process fluid is raised by a certain value. More precisely, temperature rise occurs when the stream of process fluid exits the rotor blades and passes through the diffuser and/or the vaneless space. Increased temperatures promote thermal or thermochemical degradation of feedstock species and conversion thereof into desired products. An amount of thermal energy added to the fluid is sufficient to initiate chemical degradation reactions, in particular reactions resulting in breaking down chemical bonds between long carbon-carbon (C—C) chains. Hence, high molecular weight compounds present in the fluidic stream are efficiently reduced in size. In working stages, where conditions for the temperature and the process flow are sufficient for thermal or thermochemical conversion to occur, a set of chemical reaction(s) that trigger conversion of feed hydrocarbons into target products takes place, primarily in the vaneless portion 7A of the duct.

In configurations without stationary diffuser vanes, the vaneless space is formed downstream the rotor blade cascade. Such configuration may be adopted for example for the reactor 100C shown on FIG. 2B (see stages i, iv-vii implemented without diffuser vanes 4). In such an event, the vaneless portion of the duct is configured, in terms of its three-dimensional shape, to act as an energy converter and to convert mechanical energy imparted to the process fluid by the rotor into heat.

In the reactor 100, a temperature rise can be optimized as required. The temperature rise achieved in one stage can be for example within a range of about 10° C. to about 120° C. Hence, in any one of 100A-100D (all provided as multistage solutions), the fluid can be heated to about 1000° C. in a "one-pass" configuration (taken 100° C. temperature rise per stage in a 10-stage apparatus). Since residence time the reaction fluid spends to pass through the reactor stage is in scale of fractions of seconds, such as about 0.01-0.1 seconds, fast- and efficient heating can be achieved even in a most basic configuration.

In some instances, the reactor may comprise so called inlet- and optionally outlet stages. Configurations of these stages may differ from that of the working stages.

When the process fluid (a mixture of hydrocarbon feed and gaseous diluent, such as steam) propagates between the inlet and the outlet through the working stages, its temperature rises gradually. Thermal conversion process, hereby, thermal cracking, accompanied with decomposition of feed hydrocarbons to lower molecular weight products occurs in a duct area (or areas) 10, where cracking severity is at about its maximum or at least near its maximum. Reaction temperature reaches in these duct area(s) at least 700-750° C. Dependent on feedstock, cracking is the most intense in the reactor regions, where the stream of the process fluid reaches about 700-950° C.

For example, conversion of light hydrocarbons, like some naphthas or ethane, to ethylene occurs at about 800-850° C. Within the same temperature range, the near maximum cracking severity resulting in highest ethylene yields can be achieved.

Mentioned duct area(s) 10 is/are therefore referred to as a "high-temperature region(s)" Since the region(s) 10 accommodate the most intense reactions, these are also the high turbulence area(s).

Taken that typical temperature distribution in thermal conversion processes, such as steam cracking, run in the rotary apparatus 100 (any one of 100A-100D), is within a range of about 300-500° C. at the inlet and within a range of about 800-1300° C. at the outlet, position of high-temperature region(s) 10 in the reactor 100 corresponds to a number of last working stages (viz. a number of rearmost working stages proximate to the reactor outlet or outlets 8, 8A, 8B). Within the duct region accommodating typically two-four most terminal stages, severity of operating conditions, particularly temperature, reaches the level sufficient for the cracking reactions to occur and proceed at near maximum level.

In region(s) 10 the reaction rate and optionally feed conversion rate is the highest. Accordingly, formation of coke and other foulants on reactor surfaces facing the duct 7 in regions 10 is the most intense. Within regions 10, stationary surfaces, such as inner walls of the duct 7 and stationary vane cascades 2, 4 are particularly prone to coke formation.

It is noted that span of high-temperature region(s) 10 within the reactor 100/along the duct 7 is not limited with a certain number of most terminal stages, rather it depends on a reactor configuration, a total number of (working) stages, reaction conditions, process feedstocks, and the like.

Reference is made to FIG. 1A showing the reactor 100 in configuration 100A where the casing 6 has an essentially toroid shape (a "doughnut" shape) in three-dimensional configuration, whereby the rotor system (1, 3A, 3) with related bearing assemblies (not shown) may be viewed as filling up an aperture defining an opening in the central part of the toroid. At its meridional cross-section, the casing 6 is essentially ring-shaped.

In the reactor 100A, stationary vane cascades 2, 4 are provided as essentially annular assemblies at both sides of the rotor blade cascade 3.

The reactor in configuration 100A further comprises a flow-shaping device (a flow-guiding device) 5 arranged inside the gas casing 6. In 100A, the flow-shaping device 5 is configured as an internal stationary ring-shaped structure, which accounts for establishing an essentially annular duct inside the casing 6. The device 5 is fixed in the gas casing 6 with appropriate fixtures (not shown). In some configurations, the flow-shaping device 5 may be provided as an annular, essentially hollow structure, such as a hoop, for example.

The flow-shaping device 5 may adjoin the tips of rotor blades (a gap is formed therebetween enabling unhindered rotation of the rotor) and the peripheral portions of stator vanes, in an event the stator vanes are provided on bearing blocks constituting a bearing system of the rotor (not shown). Alternatively, the stator cascades may be assembled on the flow-shaping device 5 in a manner to adjoin the rotor blades 3. Said stator vanes may thus be mounted on the flow-shaping device and/or connected thereto by means of auxiliary arrangements, such as rings, brackets, and the like (not shown). The above-mentioned features are discussed in more detail in patent documents by Bushuev (U.S. Pat. No. 9,494,038) and Seppala et al (U.S. Pat. No. 9,234,140) referenced hereinabove.

In the reactor 100A, the internal passageway is defined with a volume created between the gas casing 6 (an outer "doughnut") and the internal flow-shaping device 5 (an inner "doughnut"). This internal passageway (the duct 7) formed between an inner surface of the gas casing 6 and an outer surface of the flow-shaping device 5 thus adopts an essentially annular shape with essentially ring-shaped meridional cross-section.

Figure 1B:
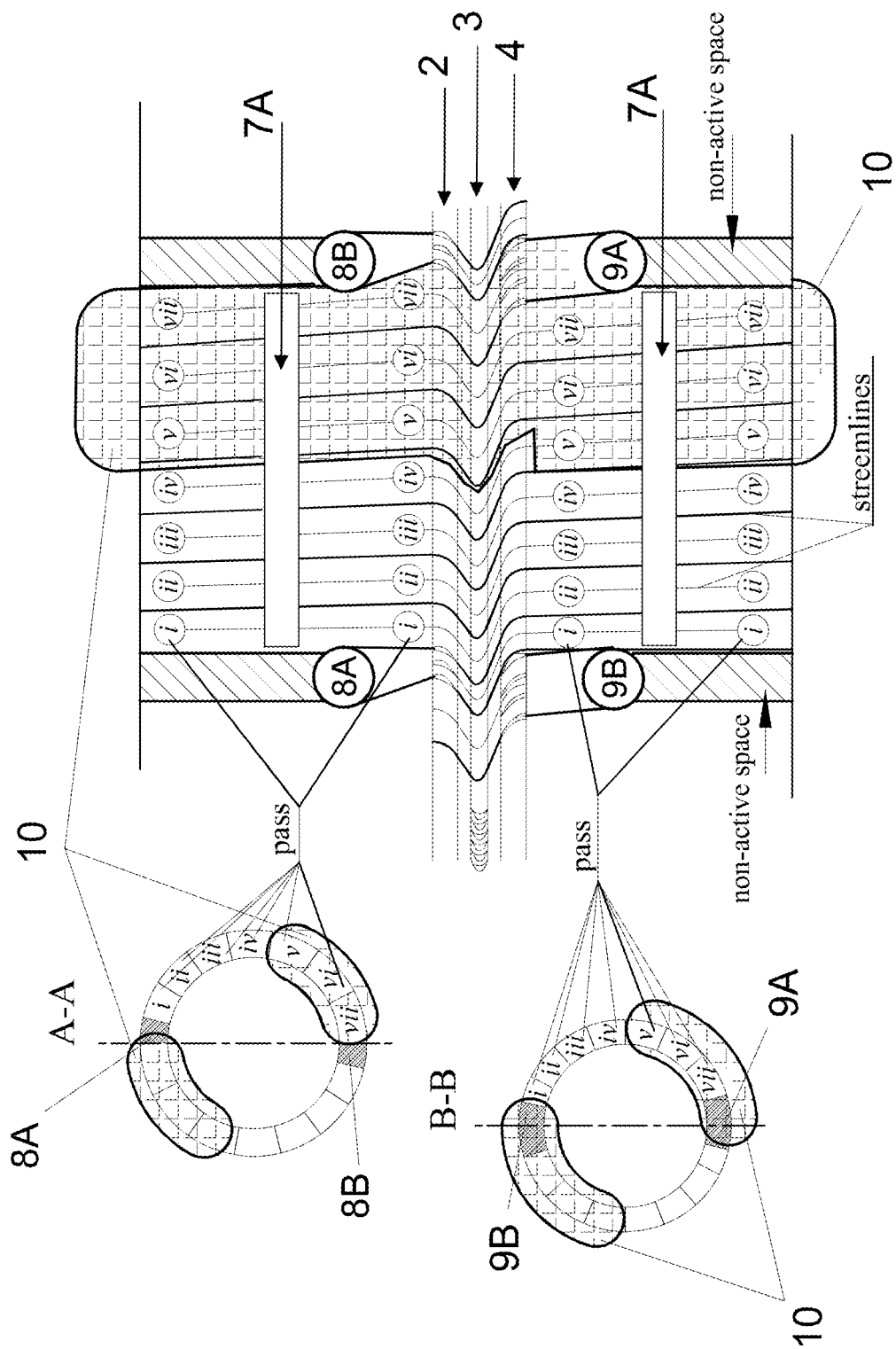
FIG. 1B shows cross-sectional views across lines A-A and B-B designated on FIG. 1A and illustrates a flow diagram for streamline passageways through the reactor 100, 100A.

Location of high-temperature region(s) 10 in the reactor 100A is shown on FIG. 1B.

FIG. 1B illustrates cross-sectional views across lines A-A and B-B designated on FIG. 1A. Cross-sectional area across the line A-A is located at the entrance (inlet) to the stationary guide vane cascade 2, while the cross-sectional area across the line B-B is located at the exit from the stationary diffuser cascade 4. Crosscuts A-A and B-B can also be viewed as depicting the events occurring at the inlet to—and the exit from the stator-rotor-stator arrangement.

Entrance (inlet) to the blade/vane cascade is generally defined with leading edges of related blades/vanes, whereas the exit from the cascade is defined with trailing edges of said blades/vanes. The entrance and exit are defined in a direction of fluid flow.

In the reactor 100A, the process fluid propagates in the duct 7, between inlet and outlet pairs (8A and 9A, and 8B and 9B respectively). FIG. 1B shows streamlines travelling between a first inlet 8A and a first outlet 9A. Streamlines travelling between the second inlet 8B and the second outlet 9B are not shown.

In the reactor 100A, a stream of feedstock-containing process fluid flows along a pathway established along essentially helical trajectory, wherein the process fluid successively passes through a number of working stages i-vii defined across the row of stationary guide vanes 2, the row of rotor blades 3 and the row of stationary diffuser vanes 4. Fluid exiting the stationary diffuser cascade 4 thus flows "upwards", traverses the vaneless space 7A and continues towards the stationary guide vane cascade 2 of a subsequent stage.

As shown on FIG. 1B, the reaction is the most intense within a region along three last regenerative passes through the cascades 2, 3, 4 (stages v-vii). Stages v-vii thus form the high-temperature region 10.

FIG. 2A illustrates the reactor 100 in configuration 100B. Reactor 100B is configured as an axial-type reactor, which generally follows a design for an axial compressor or a turbine. The reactor 100B comprises an elongated rotor 1 which extends along the horizontal axis X-X'. A plurality of rotor blades is arranged along a rotor hub into a number of sequential rows to form rotor blade cascade(s) 3. The rotor 1 is enclosed within the casing 6, inner surface of which is provided with the first- and second stationary vane cascades 2 and 4, respectively, arranged such that blades/vanes of rotor- and stator cascades 2, 3 and 4 alternate along the rotor 1 in the longitudinal direction (along the axis X-X'). Rows of stationary vanes 2, 4 can be arranged on the opposite sides of an (inner) surface of the casing facing the duct. Working stages i-vii are thus established, wherein each stage is formed with a rotor blade cascade 3 and adjacent pairs of stator vanes 2, 4. A portion 7A of the duct free of blades/vanes is arranged between subsequent stages.

The casing 6 may be a cone-shaped or it may have an essentially constant cross-section along its entire length (not shown).

FIG. 2B illustrate the reactor 100 in configuration 100C. Reactor 100C is configured as a radial turbomachine that generally follows a design for centrifugal compressors or centrifugal pumps. The term "centrifugal" implies that fluid flow within the device is radial; therefore, the reactor 100C is referred to as a "radial-flow apparatus". The reactor shown on FIG. 2B comprises a number of working stages (i-vii), wherein each stage is represented with a stationary guide vane cascade 2, a rotor blade cascade 3 and a stationary diffuser vane cascade 4. The diffuser is located in an essentially U-shaped conduit provided as a part of a duct 7 followed with a vaneless portion 7A. In some configurations, provision of diffuser vanes 4 may be omitted, whereupon vaneless U-shaped conduit located downstream the rotor blades may act as an energy converter.

In configurations 100B and 100C, high-temperature region(s) 10 begin approximately between stages v and vi and spread through a most terminal stage vii till the outlet 9. Span of regions 10 within the duct may vary depending on reactor configuration, total number of stages, process conditions, etc.

FIG. 2C illustrates, at 100D, any other kind of a multistage rotary reactor apparatus, which can be configured to adopt the method according to the embodiments. In exemplary configuration 100D, the high-temperature region 10 is established with two last stages (iv and v).

In order to suppress formation and accumulation of carbonaceous deposits, such as coke and other foulants, on reactor surfaces being in contact with the process fluid flow within the high-temperature region 10, it is proposed to supply an amount of additional gaseous diluent into the region 10. The present invention is underlain by an observation that by supplying the additional gaseous diluent into the duct 7 through perforations and/or pores made in selected structures within the high-temperature region(s) 10, formation of coke and other foulants can be prevented or at least markedly reduced.

When the hydrocarbon-containing process fluid (a mixture of hydrocarbon feed and gaseous diluent, such as steam) propagates through the duct 7, injecting additional diluent into the process-intense, high-temperature region(s) 10 has proved beneficial in suppressing coke formation in the processes of thermal or thermochemical conversion of hydrocarbon feedstocks.

The amount of additional gaseous diluent injected into the process can reach 30-35% of a total amount of the gaseous diluent. At the same time an amount of gaseous diluent at the reactor inlet can be reduced. This allows for keeping a total energy consumption at the same level (because there is no need to heat additional dilution medium) and for avoiding difficulties associated with separation of excess steam downstream.

In embodiments, the gaseous diluent is (water) steam. Injection of additional steam into high-temperature region(s) 10 effectively suppresses formation of coke and other foulants in steam cracking processes employed in production of light olefins, such as for example ethylene and propylene.

Steam supplied as an additional dilution medium into the region(s) 10 lowers the hydrocarbon partial pressure, whereby formation of coke deposition is suppressed or reduced.

Steam as additional diluent is delivered into the interior of the reactor 100, within the region(s) 10, through a number of stationary structures, including selected portions of the duct 7 facing the process fluid stream and/or stationary vanes 2, 4. In some instances, additional diluent can be injected through working/rotating blades. However, for the purposes of the present invention the stationary structures are preferred ones.

Said selected portions of the duct 7 include surface(s) that define the inner wall of the gas casing 6 (an inner surface of the gas casing), a surface of the flow-shaping device 5 that defines the duct (rf. configuration 100A), and any other surface enclosing the process fluid flow.

Delivery of steam as additional diluent into the duct 7 can be implemented through any one of the stationary guide vanes 2, stationary diffuser vanes 4, a vaneless portion 7A of the duct 7 located downstream the diffuser vanes, or any combination thereof.

To deliver steam as additional diluent into the high-temperature regions 10, selected stationary structures or portions thereof are made perforated and/or porous. Perforated and/or porous surfaces for delivery of additional dilution medium into the duct are designated on FIGS. 3A, 3B and 3C with reference number 11.

Steam as additional dilution medium is directed towards the perforated and/or porous surfaces 11 via a number of distribution channels 12, 12A arranged in any one of the stationary vanes 2, 4, the casing 6, the flow-shaping device 5, or any combination thereof. Gaseous diluent may be fed into the high-temperature region(s) 10 from the same source that supplies dilution medium, such as steam, to be mixed with the hydrocarbon feed at the reactor inlet. In said region(s) 10 a number of distribution channels 12 may be arranged to receive the gaseous medium from an external source of dilution medium (not shown). Channels 12 are advantageously arranged to branch over the desired locations into multiple branch channels 12A (rf. FIG. 3C).

Supply and distribution channels 12, 12A may be further expanded to form a distribution space 12B over at least a portion of a structure having a perforated/porous surface 11 (rf. FIG. 3C), to enclose the surface(s) 11. By enclosing perforated and/or porous surfaces 11, the gaseous diluent can be uniformly distributed, through the perforated/porous structure (11), inside the reaction space (i.e. within the duct 7 and its vaneless portions 7A). The distribution space 12B may be provided as an expansion part or parts of the branched channel(s) 12A.

Distribution channels 12, 12A, 12B and a number of perforated and/or porous surfaces 11 together form a steam delivery arrangement for the rotary reactor. In said arrangement, the distribution channels 12, 12A, 12B are configured to deliver steam to the perforated and/or porous surfaces 11, which enable a flowthrough of steam to the reaction space. The latter is defined with an interior space of the reactor, viz. the duct 7. The steam delivery arrangement is preferably installed within the high-temperature regions 10.

Diluent feed through the stationary blades 2, 4 is implemented such that the gaseous diluent supplied into a blade cavity through the branched channel 12A, whereby diluent exits the blade cavity (and enters the reaction space/the duct 7) through a plurality of holes/pores arranged in the blade wall. Perforated stationary blades 2, 4 are shown on FIGS. 3A and 3B (lower images).

FIGS. 3A-3C illustrate exemplary locations from supplying additional gaseous diluent into the reactor along the high-temperature region(s) 10. Streams of additional gaseous diluent is shown on FIGS. 3A (upper image), 3B (upper image) and 3C with arrows.

Modification of all or selected stationary blades within the regions 10 can be performed as follows. Any one of the vertical surfaces of the blade shell, namely the pressure side, i.e. where the flow enters the blade and/or the suction side, i.e. where the flow separates from the blade, can be made perforated or porous. In some instances, the entire blade shell may be made of porous material.

Provision of perforated and/or porous surfaces 11 on the pressure side of an airfoil will create a diluent boundary level and hence decrease concentration of hydrocarbons near the blade's wall. Modification of the blade pressure side with perforated/porous surfaces 11 can be made for all or selected stationary guide vanes and/or for all or selected stationary diffuser vanes. On the other hand, provision of surfaces 11 on the suction side allows for preventing a return vortex formed by the flow leaving the blade from contacting the blade again. Modification of the suction side may be preferred for all or selected stationary diffuser blades.

Additionally or alternatively, the casing 6 and the flow-shaping device 5 (where applicable) can be modified to incorporate perforated and/or porous surfaces 11. Within region(s) 10, any surface of the duct 7 enclosing the process fluid flow may be modified to include perforations and/or pores. For example, surfaces 11 may be arranged within a region of flow separation, where the process flow makes a turn after exiting diffuser blades (see FIG. 3C, encircled areas 12B).

Overall, positions of perforated and/or porous surfaces 11 are optimized to prevent coke formation. For example, arranging surfaces 11 at the suction side of diffuser blades (where flow separates from the blade) is not used in conventional blade cooling.

Portions of the reactor comprising perforated and/or porous surfaces 11 can be composed of composites, metals, metal alloys, ceramics, cermets, or combinations thereof.

Formation of deposits on the reactor surfaces can further be prevented through controlling the (additional) steam flow rate supplied towards the surfaces 11 through the distribution channels 12, 12A, 12B.

In the method, the temperature of additional steam supplied into the region(s) 10 is lower than- or equal to the temperature of the process fluid. By adjusting the stream of additional steam diluent injected into the duct region(s) 10 to a temperature lower than the temperature of the process fluid stream flowing through the duct, said additional steam can be used for cooling parts and components of the reactor, including stationary- and non-stationary components, such as stationary- and rotor blades for example. Additional steam is typically injected at a pressure higher than that of the process fluid stream.

In an aspect, a steam delivery arrangement is provided for a rotary reactor 100 used in thermal or thermochemical conversion of hydrocarbon feedstocks in presence of steam, said arrangement comprising: distribution channels 12, 12A, 12B, and a number of perforated and/or porous surfaces 11 arranged on stationary vanes 2, 4 and/or on selected portions of the duct 7, which defines a reaction space of the rotary reactor. The distribution channels 12, 12A, 12B are configured to deliver steam to the perforated and/or porous surfaces 11, which enable a flowthrough of steam to the reaction space. The steam delivery arrangement is installed in such sections of the rotary reactor, which enclose the high-temperature region(s) 10 of the reaction space where conditions are established for thermal or thermochemical conversion to occur. In some instances, the elements 11, 12 of the steam delivery arrangement may be incorporated into at least some of the rotor blades 3.

Use of said steam delivery arrangement in reducing coke formation during thermal or thermochemical conversion of hydrocarbon feedstocks in the rotary reactor 100 optionally accompanied with cooling the reactor parts and components is further provided, wherein reduction of coke formation and optionally cooling is achieved by delivery of an amount of additional steam into high-temperature region(s) 10 of the reaction space in a manner described herein above.

In an aspect, a rotary reactor 100 (100A, 100B, 100C, 100D) for thermal or thermochemical conversion of hydrocarbon-containing feedstocks in a gaseous diluent, is provided, comprising: a casing 6 with at least one inlet 8 and at least one outlet 9, a rotor 1 with a plurality of rotor blades 3 arranged into at least one row over a circumference of a rotor hub mounted onto a rotor shaft, and a plurality of stationary vanes 2, 4 arranged adjacent to the at least one row of rotor blades, wherein the rotor and the plurality of stationary vanes are enclosed in a duct 7 formed in the casing between at least one inlet and at least one outlet. The reactor comprises perforated and/or porous surfaces 11 arranged on selected portions of the duct-defining structures and/or on stationary vanes 2, 4 to enable a flow of additional gaseous diluent therethrough, wherein said perforated and/or porous surfaces are arranged in high-temperature region or regions of the duct where conditions are established for thermal or thermochemical conversion to occur.

In embodiments, the perforated and/or porous structural surfaces are integrated into all or selected stationary vanes and/or selected portions of a duct wall facing the process fluid flow, and optionally into at least some of the rotor blades.

The reactor is configured to for heat-assisted conversion of feedstocks in fluidic dilution media, in particular, for thermal- or thermochemical cracking of hydrocarbon-containing feedstocks. Cracking processes involve fluidized hydrocarbon-containing feedstocks (viz., fluidized organic feedstock matter that primarily comprises carbon- and hydrogen). In embodiments, the process is steam cracking of hydrocarbon containing feedstocks to produce olefins, such as ethylene and propylene.

Additionally or alternatively, the heat-assisted conversion of feedstocks may involve processing organic feedstocks. In some configurations, the reactor 100 can be adapted to process cellulose-based feedstocks. In some additional or alternative configurations, the apparatus 100 can be adapted to process (waste) animal fats- and/or (waste) vegetable oil-based feedstocks. Preprocessing of said animal fats- and vegetable oil-based feeds may include hydrodeoxygenation (removal of oxygen from oxygen containing compounds) that results in breaking down (tri)glyceride structures and yields mostly linear alkanes. In further additional or alternative configurations, the reactor 100 can be adapted to process by-products of wood pulp industry, such as tall oil or any derivatives thereof.

Hence, in some instances, the hydrocarbon-containing feed may be gasified preprocessed biomass material (cellulose- or lignocellulose-derived preprocessed biomass, supplied into the reactor in substantially gaseous form). Other organic feedstocks may include preprocessed glyceride-based materials, such as (waste or residual) vegetable oils and/or animal fats, or preprocessed plastic waste or residue. Preprocessing of said (tri)glyceride-based feedstocks may include different processes, such as pyrolysis or deoxygenation, as described above. A range of plastic waste comprising PVC, PE, PP, PS materials and mixtures thereof can be utilized in the processes of recovery of pyrolysis oil or gas that can be further used as a feedstock for producing new plastics and/or refined to fuel oil(s) (diesel equivalents).

Hence, the reactor 100 can be configured for executing an at least one procedure selected from the group consisting of: processing hydrocarbon feedstock preferably containing medium and light weight hydrocarbon fractions; processing gasified carbohydrate-containing feedstock matter, processing gasified glyceride- and/or fatty acid-containing feedstock matter, and processing gasified cellulosic biomass material.

In an event of using organic feedstocks, the reactor 100 may be further adapted for catalytic processes. This is achieved by a number of optional catalytic surfaces (not shown) formed by catalytic coating(s) of the blades or internal walls being in contact with process fluid(s). In some instances, the apparatus may comprise a number of catalytic modules defined by ceramic or metallic substrate(s) or support carrier(s) with an active (catalytic) coating optionally realized as monolithic honeycomb structures.

It is clear to a person skilled in the art that with the advancement of technology the basic ideas of the present invention may be implemented in various ways. The invention and its embodiments may generally vary within the scope of the appended claims.

The invention claimed is:
1. A method for reducing coke formation during thermal or thermochemical conversion of hydrocarbon feedstocks in presence of steam using a rotary reactor comprising a rotor with a plurality of rotor blades arranged into at least one row over a circumference of a rotor hub mounted onto a rotor shaft, and
a plurality of stationary vanes arranged adjacent to the at least one row of rotor blades, wherein the rotor and the plurality of stationary vanes are enclosed in a duct formed in a casing between at least one inlet and at least one outlet, the method comprises:
during propagation of a process fluid provided as mixture of-hydrocarbon feed and dilution steam in the duct between at least one inlet and at least one outlet, supplying an amount of additional steam into a duct region or regions where conditions are established for thermal or thermochemical conversion to occur in the process fluid,
wherein said additional steam is supplied into the duct through perforated and/or porous surfaces arranged on selected portions of the duct and/or on stationary vanes.

2. The method of claim 1, comprising supplying the amount of additional steam into the process fluid propagating through the duct region(s), where reaction temperature equals to or exceeds a value of about 750 degrees Centigrade.

3. The method of claim 1, comprising supplying the amount of additional steam into the duct region(s) accommodating a number of last working stages of the rotary reactor.

4. The method of claim 1, wherein the amount of additional steam is supplied into the duct through perforated and/or porous surfaces arranged on stationary guide vanes upstream of the rotor blades, and optionally on stationary diffuser vanes downstream of the rotor blades.

5. The method of claim 1, wherein the amount of additional steam is supplied into the duct through perforated and/or porous surfaces arranged on selected portions of the duct facing a process fluid stream.

6. The method of claim 1, wherein the amount of additional steam is supplied into the duct through perforated and/or porous surfaces arranged along a duct-defining inner wall of the casing.

7. The method of claim 1, wherein the amount of additional steam is supplied into the duct through perforated and/or porous surfaces arranged along a duct-defining wall of a flow-shaping device.

8. The method of claim 1, wherein the amount of additional steam is directed towards perforated and/or porous surfaces via a number of distribution channels connected to a steam source.

9. The method of claim 1, wherein the perforated and/or porous surfaces are composed of composites, metals, metal alloys, ceramics, cermets, or combinations thereof.

10. The method of claim 1, further comprising reducing an amount of steam at the reactor inlet or inlets.

11. The method of claim 1, wherein the amount of additional steam is up to about 30% out of a total amount of steam used in thermal or thermochemical conversion process.

12. The method of claim 1, wherein said additional steam supplied into the duct is adjusted to a temperature lower than the temperature of the process fluid stream to cool parts and components of the rotary reactor.

13. The method of claim 1, wherein thermal or thermochemical conversion of hydrocarbon feedstocks is steam cracking of hydrocarbon feedstocks to produce olefins.

14. The method of claim 4, wherein the amount of additional steam is further supplied into the duct through the perforated and/or porous surfaces arranged on stationary diffuser vanes downstream of the rotor blades.

15. The method of claim 13, wherein the olefins comprise at least one of ethylene and propylene.

16. The method of claim 2, comprising supplying the amount of additional steam into the duct region(s) accommodating a number of last working stages of the rotary reactor.

17. A steam delivery arrangement for a rotary reactor used in thermal or thermochemical conversion of hydrocarbon feedstocks in presence of steam, said arrangement comprising:
   distribution channels, and
   a number of perforated and/or porous surfaces arranged on selected portions of a duct, which defines a reaction space of the rotary reactor, and/or on a number of stationary vanes of the rotary reactor,
   wherein the distribution channels are configured to deliver steam to the perforated and/or porous surfaces, which enable a flowthrough of steam to the reaction space,
   wherein said arrangement is installed in such sections of the rotary reactor, which enclose the region(s) of the reaction space where conditions are established for thermal or thermochemical conversion to occur.

18. A rotary reactor for thermal or thermochemical conversion of hydrocarbon-containing feedstocks in presence of steam, comprising the steam delivery arrangement according to claim 17.

19. A rotary reactor for thermal or thermochemical conversion of hydrocarbon-containing feedstocks in a gaseous diluent, comprising:
   a casing with at least one inlet and at least one outlet,
   a rotor with a plurality of rotor blades arranged into at least one row over a circumference of a rotor hub mounted onto a rotor shaft, and
   a plurality of stationary vanes arranged adjacent to the at least one row of rotor blades, wherein the rotor and the plurality of stationary vanes are enclosed in a duct formed in the casing between at least one inlet and at least one outlet,
   wherein the reactor comprises perforated and/or porous surfaces arranged on selected portions of the duct and/or on stationary vanes to enable a flow of additional gaseous diluent therethrough, wherein said perforated and/or porous surfaces are arranged in a duct region or regions where conditions are established for thermal or thermochemical conversion to occur.

20. The rotary reactor of claim 19, wherein perforated and/or porous surfaces are composed of composites, metals, metal alloys, ceramics, cermets, or combinations thereof.

* * * * *